United States Patent [19]

Öberg

[11] 4,356,086
[45] Oct. 26, 1982

[54] APPARATUS FOR RECOVERING OIL OR THE LIKE FLOATING ON A LIQUID SURFACE SUCH AS WATER

[75] Inventor: Per O. Öberg, Nordmaling, Sweden

[73] Assignee: Sanera Projecting Aktiebolag, Nordmaling, Sweden

[21] Appl. No.: 183,893

[22] Filed: Sep. 4, 1980

[30] Foreign Application Priority Data

Sep. 11, 1979 [SE] Sweden .............................. 7907544

[51] Int. Cl.³ .............................................. E02B 15/04
[52] U.S. Cl. .................................. 210/115; 210/242.3; 210/923
[58] Field of Search ...................... 210/242.3, 411, 923, 210/115

[56] References Cited

U.S. PATENT DOCUMENTS

| | | | |
|---|---|---|---|
| 3,653,510 | 4/1972 | Fitzgerald | 210/923 |
| 3,662,891 | 5/1972 | Headrick | 210/923 |
| 3,810,480 | 5/1974 | Smith | 210/411 |
| 3,815,751 | 6/1974 | Pavlovic | 210/242.3 |
| 3,853,767 | 12/1974 | Mohn | 210/242.3 |
| 3,853,768 | 12/1974 | Bagnulo | 210/923 |
| 3,909,416 | 9/1975 | Veld | 210/923 |
| 4,133,765 | 1/1979 | Stupici | 210/242.3 |
| 4,136,008 | 1/1979 | Pogonowski | 210/923 |

FOREIGN PATENT DOCUMENTS 96580 9/1955 Netherlands ........................ 210/115

Primary Examiner—Thomas G. Wyse
Attorney, Agent, or Firm—Blanchard, Flynn, Thiel, Boutell & Tanis

[57] ABSTRACT

The present invention concerns an arrangement for collecting of oil (11) and other contaminations floating on a water surface. The arrangement includes a container-like structure (7) floating on the water and provided with a closable inlet (15) for water and oil and located at the water surface level. In the bottom of the container-like structure (7) there is provided downwardly projecting tubes (16–18) ending into the water and provided with pump means (19–21) for pumping water in and out. At the upper portion of said structure (7) there is connected an outlet pipe (8) for oil. When pumping out water, oil is collected in the container space and at a subsequent pumping in of water the oil is pressed out through said outlet pipe (8), the inlet opening (15) being closed at that occasion.

10 Claims, 5 Drawing Figures

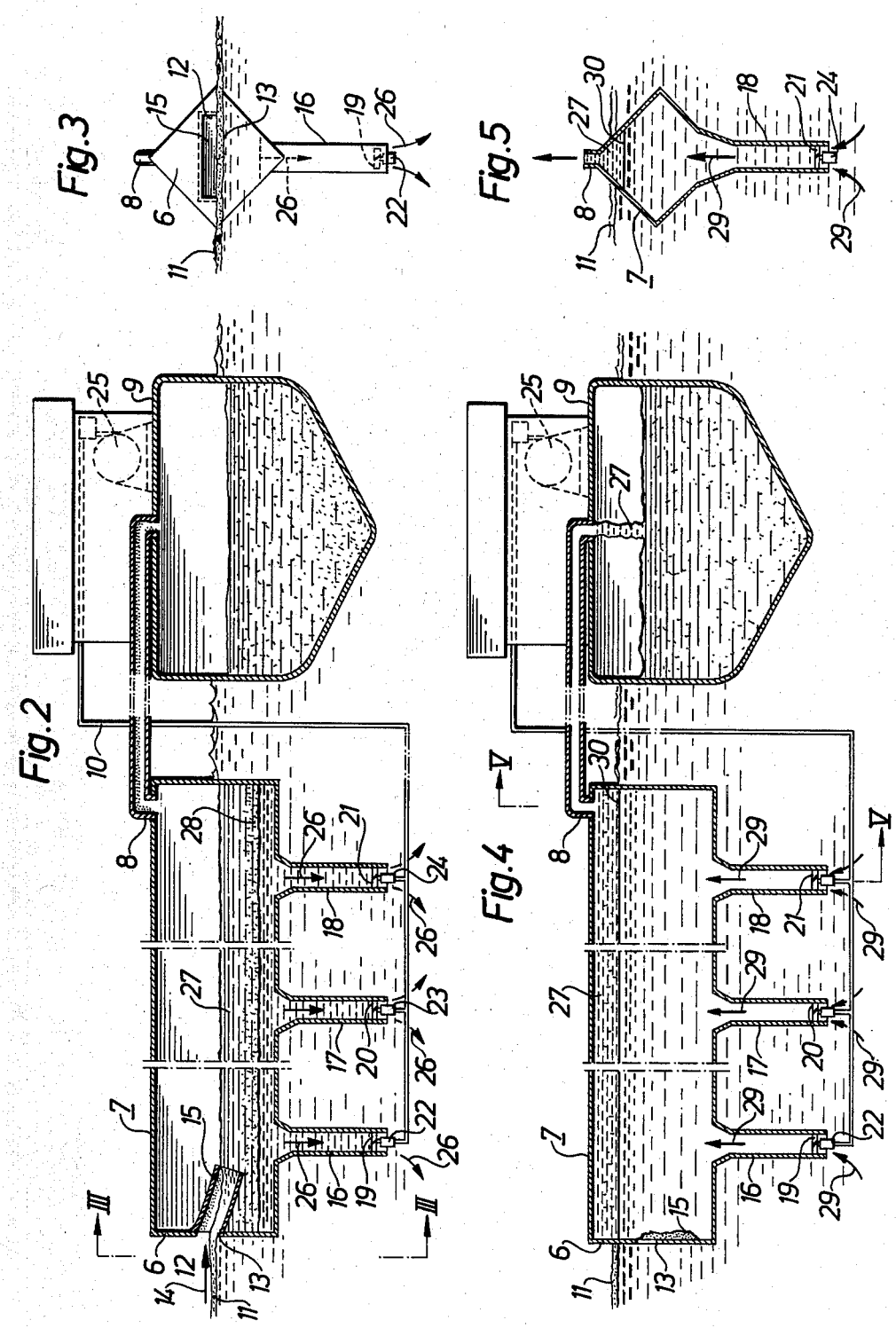

APPARATUS FOR RECOVERING OIL OR THE LIKE FLOATING ON A LIQUID SURFACE SUCH AS WATER

FIELD OF THE INVENTION

This invention rleates to an apparatus for recovering oil or the like floating on a liquid surfce such as water.

BACKGROUND OF THE INVENTION

The technique prevailing at present for catching oil floating on water is to use interconnected boom sections, which at their free ends are towed by a vessel for the respective end, or are anchored by these ends against the prevailing wind direction. There is thus a concentration of the oil floating on the water towards the point of juncture between the boom lengths. The current method of recovering the oil is to pump it up, using some suitable pumping apparatus. This can however only take place when there is insignificant sea motion and in conditions which are otherwise favourable. The ever-present problem in recovering oil is to get the oil within a closed chamber as soon as possible, to prevent oil spilling over the boom sections due to wind and sea motion. Many methods for this have been proposed, and many have functioned relatively well in practice, although mostly only under favourable conditions of weather and wind.

It has been previously proposed to discharge water and oil into a container, and thereafter pump the water in the container away, the next step being to pump the oil over to a vessel or tow the container to land. The method is rather complicated and time-consuming, taking into account that considerable amounts of water are discharged into the container and must be pumped up from it. Furthermore, a careful check must be kept on oil and water levels, so that oil is not pumped out again into the surrounding water. It has also been previously proposed to arrange propeller means in tubular casings disposed vertically in the water with the upper opening immediately under the water surface. When the propeller means are started for evacuation, a liquid whirlpool is accomplished, which thus forms a funnel-like portion in the surrounding water. Oil can be then freely sucked down into this funnel-like portion, rotated, and evacuated therefrom into some suitable container. The method is indeed effective, but is is also sensitive to sea movement and the suction power set on the propeller apparatus.

The present invention relates to a solution of the problem mentioned above. Concentration of oil floating on the water is achieved in a simple way, and the oil can be transferrred to a storage container by a simple means.

What is characteristic for the present invention is apparent from the following patent claims.

One embodiment of the invention will now be described while referring to the appended drawings.

BRIEF DESCRIPTION OF THE DRAWINGS

FIG. 2 is a longitudinal section to an enlarged scale of an apparatus in accordance with the invention.

FIG. 3 is a view seen in the direction of the line III—III in FIG. 2.

FIG. 4 is a section of the apparatus as seen in FIG. 2 but during another work operation.

FIG. 5 illustrates a section along the line IV—IV in FIG. 4.

DETAILED DESCRIPTION

Figure 1:
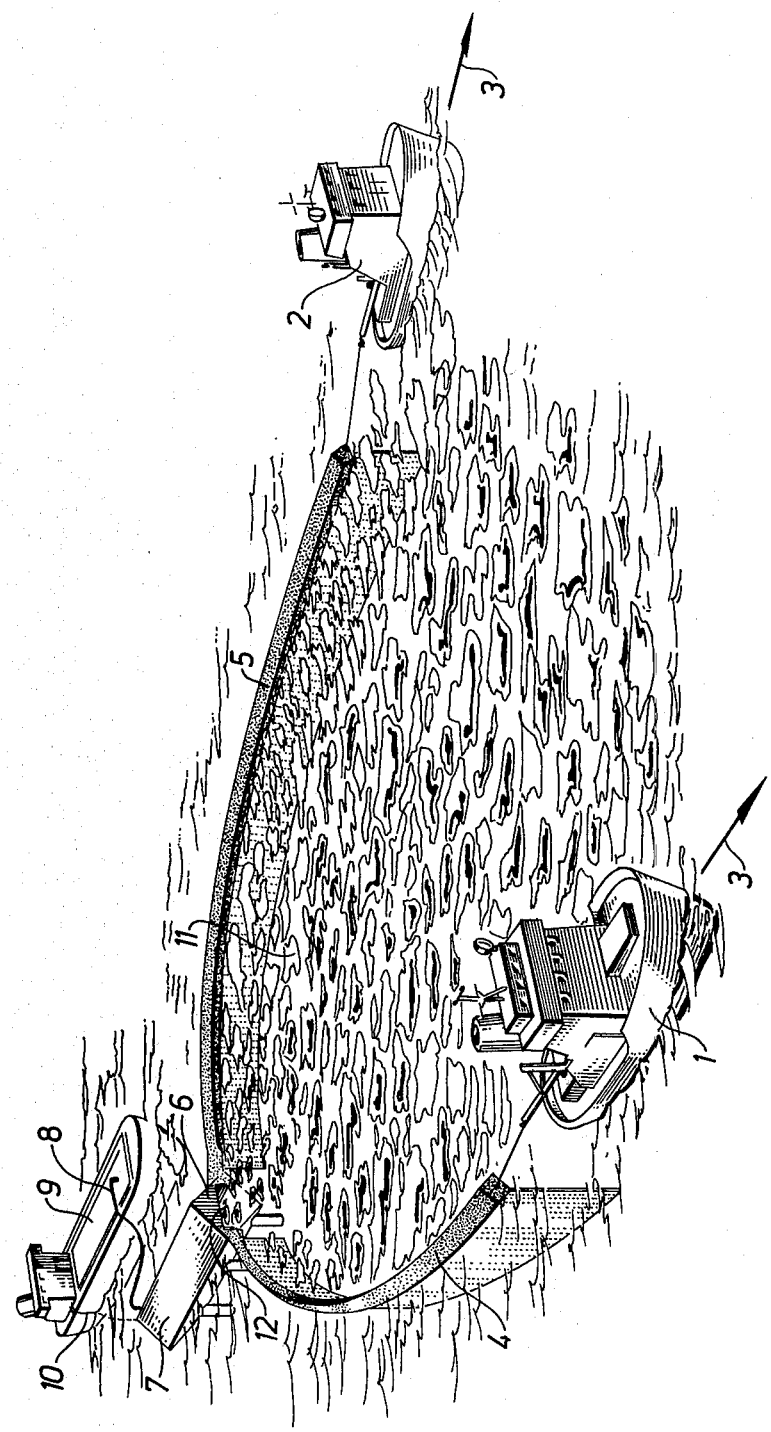
FIG. 1 illustrates two vessels towing a boom loop consisting of two booms for surrounding an oil belt, there being connected to the booms an apparatus in accordance with the present invention.

FIG. 1 illustrates in perspective two vessels 1, 2 sailing in the direction of arrows 3. A boom length 4,5 is connected to the respective vessel. The ends of the boom lengths 4,5 are each connected to the inlet portion 6 of an oil concentrating apparatus 7, formed as an elongate container. The upper part of the oil concentrating apparatus 7 is a communication via a hose 8 with an oil tanker 9 for recovering the collected oil. An operation line 10 goes from the tanker 9 for controlling propeller means in the oil concentrating apparatus 7, as will be described later. The apparatus 7 is provided with floating bodies (not shown), or other means for keeping it floating at a desired level. As illustrated, the apparatus 7 has a substantially quadratic cross-sectional shape and is adapted for floating with a diagonal substantially in the plane of the water surface.

The oil 11 floating between the boom lengths 4 and 5 is urgedforwards by the movement of the boats 1,2, towards the inlet portion 6 of the oil concentration apparatus 7. This inlet portion is provided at water level with a rectangular opening 12, the bottom edge 13 of which is just above the water surface. As is more clearly apparent from FIG. 2, water and oil are urged in the direction of the arrow 14, in through the opening 12 and into the interior of the apparatus 7. The opening 12 is closeable by a wide hose 15, one end of which is placed around the opening, the hose extending interiorally into the chamber. As is apparent from FIG. 2, the remaining part of the hose 15 is capable of freely altering its attitude inside the apparatus 7. In the lower part of said apparatus, there are three verticically downwardly directed pipes 16, 17, 18 communicating with the interior of said apparatus. At the lower end of said pipes there are respectively arranged pump means 19, 20 and 21 driven by motors 22, 23 and 24. Said motors are in communication with a power supply cable included in the operation line 10. This cable 10 is in turn connected to a power unit 25 on the vessel 9. Power transmission can be electric, hydraulic, pneumatic, or power can be provided in some other suitable way. The pump meeans suitably have a variable pumping capacity.

The apparatus illustrated functions in the following mode. It is assumed that oil and water flow in, according to the direction of arrow 14. It is also assumed that the pump means 19, 20 and 21 are driven such that water is evacuated in the direction of the arrows 26, i.e. water flows from the interior of the apparatus 7 and out into the surrounding water. As water and oil flow into the apparatus 7, and water is continually evacuated therefrom by the pump means 19–21, a concentration of oil will take place, so that an oil layer 27 with considerable thickness is obtained as water level 28 sinks in the apparatus, with the aid of the evacuating propeller means 19, 20 and 21. Oil and water are supplied continuously through the opening 12, and the described process continues until a suitable thickness of the oil layer 27 has been arrived at.

When this thickness has been obtained, the direction of rotation of the pump means 19, 20 and 21 is reversed by suitable operation from the vessel 9 of the motors 22, 23 and 24. As is apparent from FIG. 4, water will hereby flow in the direction of the arrows 29 through respective pipes 16, 17 and 18. The apparatus 7 will thus be filled with water, which results in that the oil layer 27 will rise and exercise a closing force on the hose 15, which, as is apparent from FIG. 4, will be in a closed, sealing position during the operation in question. Oil will thus be urged up against the roof of the apparatus 7 by means of the water, and under the increasing pressure the oil will be forced up into the pipe 8 and over into the vessel 9. As is apparent from FIGS. 4 and 5, the water has now risen to a level 30, i.e. close to the upper portion of the apparatus 7, at which level it can be suitable to break off the transfer of oil to the vessel 9, so that there is no risk of passing water into the oil tanks of the vessel, with regard to the movements of water in the apparatus 7 due to the motion of the sea, for example. The propeller means 19-21 are subsequently given a rotation as in FIG. 2, i.e. a rotation evacuating the water. The water level will then sink below the threshold 13 of the inlet opening 12, the port 15 automatically opening to permit inflow of oil and water in the mode previously described.

The apparatus now proposed is extremely effective, even in a high sea, with regard to the fact that the oil ringed in by the boom arms on the water can easily be discharged into a separate chamber space such as the apparatus 7, and from there transferred in a simple mode to a ship or a tank floating on the water without needing to resort to means for pumping the oil itself. Furthermore, it is not necessary to arrange any non-return valves or other control means in the transfer hose 8 to the ship, since these means are entirely passive during filling the apparatus 7. Neither is it necessary to be particularly careful with regard to other debris floating on the water and oil, since the hose 8 can be given dimensions such that this debris, e.g. paper and the like, can easily pass over to the vessel 9 and no stoppage of pumps need ever be risked. To prevent larger objects from coming into the hose 8 a grid or similar can be placed at the inlet thereof. If heavy oil is to be recovered, for example, heating means can be provided for the hose 8 as well as the upper part of the apparatus 7, to facilitate the transfer of the oil to the vessel 9, and such means can consist of jackets for the passage of steam, or the like. It will be clearly seen that the intervals for transferring oil, as in FIGS. 4 and 5, from the apparatus 7 to the vessel 9 can be made extremely short, since here it is only a question of supplying sufficient power to the pumping means for providing sufficient pressure. When the pumping means operate in the water evacuation direction 26, as in FIGS. 2 and 3, no great power need be supplied since it is only a question of keeping up a sufficient flow of water, to build up the necessary thickness of the oil layer 27. A further advantage of the apparatus is that no operators need to be in action outside the vessels 1, 2 or 9, e.g. in small boats for regulating the use of the apparatus included. The whole procedure can be looked after entirely mechanically. This is of great importance from the point of view of personal safety, with regard to the fact that oil recovery work is always risky, e.g. during cold weather and high seas, when consideration must always be taken to the fact that deck surfaces and the like will be covered with oil due to wave motion.

The speed of the vessels 1 and 2 is of great importance in collecting the oil 11. It has thus been found that the vessels should only sail at most about 1 knot. Turbulence occurs around the booms at higher speed, and the oil can thus leak out. The same thing applies to the outflow speed through the pipes 16, 17 and 18. If the linear flow speeds are more than about 1 knot (1852 m/h) turbulence occurs in the container 7 and oil accompanies the water flow out through the pipes. The pump means 19-21 should consequently have a regulatable pumping capacity, since in the phase illustrated in FIG. 4 it can be suitable with a higher flow rate through the pipes 19-21 than what is possible to maintain during the phase illustrated in FIG. 2. It is furthermore suitable with a plurality of pump pipes 19-21, whereby the collective cross-sectional area can be made large.

The necessary power for pumping the oil from the container 7 to the vessel 9 or a floating container, is naturally dependent on the height of the ridge of the apparatus 7 and the deck of the vessel 9 above the water surface. This level should be kept as low as circumstances permit, and an advantage in the use of (smaller) containers in comparison with using a vessel 9 is that said level can be at a minimum. The invention is naturally not limited to the embodiment above, which has been selected as an example. The apparatus 7 can thus have any suitable cross-sectional shape at all. The pipes 16, 17 and 18 can suitably be made from the same material as the apparatus 7, e.g. fabric-based plastics stretched out on a frame. There is a certain advantage in the apparatus 7 as well as the pipes 16, 17 and 18 having some mobility so that they accompany sea motion, provided they have sufficient stiffness so thta they do not collapse during the water evacuation phase. Especially with large dimensions, it can be suitable to form the apparatus 7 as a body articulated in sections, and the pipes 16, 17 and 18 rigid and articulatedly attached to the respective section. The division in two sections has the advantage that during sea motion, the threshold 13 can more easily be kept in the vicinity of the water surface. Instead of the pipe 15, a pivotable hatch or a loosely dependent screen can be arranged to function as a non-return valve.

According to FIGS. 2 and 4, oil is pumped over to a vessel 9, but it is naturally also possible to pump the oil over into floating containers. In this case a plurality of interconnected containers, e.g. in a row, are used. The containers can be towed to land after they have been filled, or their content can be pumped over to a tanker or the like, out to sea.

I claim:

1. In an apparatus for recovering oil, or the like, floating on the surface of a liquid, e.g. water, comprising a hollow body having an inlet opening open to flow of oil and water therethrough into said body, pump means for evacuating water which has flowed into the body in order to concentrate the oil in the body, closure means for preventing liquid flow out through said inlet opening upon forcing of water into said body for raising of the interior liquid level and therewith forcing of oil towards the upper portion of the body, and means effecting communication of said upper portion of said body with an oil receiving container for transferring oil thereto in response to said raising of said interior liquid level, the improvement comprised in that said body is adapted to float partly immersed in said liquid with said inlet opening adjacent said liquid surface for said flow of oil and water into said body, said pump means being reversible for alternately carrying out said evacuating of water from said body and forcing of water into said body, at least one pipe downwardly directed from said body into and communicating with the surrounding water, said body and pipe comprising a hollow body-pipe unit, said reversible pump means being arranged inside said body-pipe unit below said inlet opening in communication with said pipe for pumping water through said pipe from the lower portion of said body to said surrounding water and vice versa, said closure means being a member arranged for closing the inlet opening against overflow from said body in cooperation with said reverse operation of said pump.

2. Apparatus as claimed in claim 1, wherein the closure means is a flexible hoselike conduit extending from said opening into said body and collapsible to a closed condition in response to a relatively high liquid level in said hollow body and openable to admit oil and water through said inlet opening into said hollow body in response to a relatively low liquid level in said hollow body.

3. Apparatus as claimed in claim 1, wherein the hollow body is elongate, has a substantially quadratic cross-sectional shape and has a floating position such that one of the diagonals of the quadratic section is substantially parallel to said liquid surface, a communication hose being attached to the upper portion of the hollow body, above the water level, for transferring oil to a said oil receiving container.

4. Apparatus as claimed in claim 3, in which the other diagonal of the quadratic cross-sectional shape extends substantially perpendicular to the surface of the liquid in which said body is partly immersed, and forms a stop ridge and a bottom ridge extending along the top and bottom of said elongate hollow body, said communication hose being connected to said body adjacent said top ridge, a plurality of said pipes distributed along the length of said body and depending therefrom for complete immersion in the surrounding liquid, said pump means comprising an axial flow propeller substantially coaxial within each of said depending pipes.

5. Apparatus as claimed in claim 4, in which said propellers are located adjacent the lower ends of said depending pipes for operating well below the surface of the surrounding liquid.

6. Apparatus as claimed in claim 4, in which said inlet opening is a relatively vertically narrow, horizontally wide, approximately rectangular slot in the end of said body, said slot extending along said one diagonal and approaching the width of said body thereat, said slot being spaced vertically from both the top and bottom of said body, said closure means being a flexible hoselike conduit corresponding in cross section to said inlet opening and extending therefrom into said body so as to extend inward from said body end wall in response to entry of surrounding liquid through said inlet opening into said body and so as to collapse agaisnt the interior face of said end wall in response to a rise in liquid level within said body above the surrounding liquid level due to said reverse operation of said pump means.

7. Apparatus as claimed in claim 3, in which said communication hose is free of non-return valves.

8. Apparatus as claimed in claim 1, including a plurality of said reversible pump means and means for control and operation of the plural reversible pump means by a common driving power means.

9. Apparatus as claimed in claim 8, wherein said pump means are of variable pumping capacity, said pump means having an outflow rate from said body which is less than its inflow rate when reversed for pumping surrounding water into said body.

10. Apparatus as claimed in claim 9, in which said pump means is set for an outflow rate of no more than about one knot.

* * * * *

UNITED STATES PATENT AND TRADEMARK OFFICE
CERTIFICATE OF CORRECTION

PATENT NO. : 4 356 086
DATED : October 26, 1982
INVENTOR(S) : Per O. Öberg

It is certified that error appears in the above—identified patent and that said Letters Patent is hereby corrected as shown below:

Column 5, line 28; change "stop" to ---top---.

Column 6, line 18; change "agaisnt" to ---against---.

Signed and Sealed this

Twenty-second Day of February 1983

[SEAL]

Attest:

GERALD J. MOSSINGHOFF

Attesting Officer        Commissioner of Patents and Trademarks